(12) United States Patent
Codispoti et al.

(10) Patent No.: US 7,689,730 B2
(45) Date of Patent: Mar. 30, 2010

(54) DATA OUTPUT SYSTEM AND DATA OUTPUT METHOD WITH DATA OUTPUT MONITORING (75) Inventors: Giuseppe Codispoti, Zurich (CH); Ernst Dubach, Bremgarten (CH)

(73) Assignee: UBS AG, Zurich (CH)

( * ) Notice: Subject to any disclaimer, the term of this patent is extended or adjusted under 35 U.S.C. 154(b) by 537 days.

(21) Appl. No.: 10/970,981

(22) Filed: Oct. 25, 2004

(65) Prior Publication Data
US 2006/0039013 A1    Feb. 23, 2006

(30) Foreign Application Priority Data
Aug. 19, 2004  (EP) .................................. 04019708

(51) Int. Cl.
*G06F 13/00*  (2006.01)
*G06F 3/00*   (2006.01)
(52) U.S. Cl. .................... 710/15; 710/18; 710/19; 700/91; 700/108
(58) Field of Classification Search .................. None
See application file for complete search history.

(56) References Cited

U.S. PATENT DOCUMENTS

| 7,136,941 | B2 * | 11/2006 | Nguyen et al. | 710/15 |
| 2002/0046238 | A1 * | 4/2002 | Estavillo et al. | 709/203 |
| 2003/0053128 | A1 * | 3/2003 | Oyama | 358/1.15 |
| 2003/0231328 | A1 * | 12/2003 | Chapin et al. | 358/1.13 |
| 2004/0080783 | A1 * | 4/2004 | Owen et al. | 358/1.15 |
| 2004/0085565 | A1 * | 5/2004 | Owen et al. | 358/1.14 |
| 2004/0139115 | A1 | 7/2004 | Schmidt et al. | 707/104.1 |
| 2004/0190042 | A1 * | 9/2004 | Ferlitsch et al. | 358/1.15 |
| 2004/0212818 | A1 * | 10/2004 | Harada | 358/1.13 |

FOREIGN PATENT DOCUMENTS

WO    WO 02/19182 A2    3/2002

OTHER PUBLICATIONS

Article entitled "OS/2 Office: Specifying Time to Print Documents at Creation of Printer" published in IBM Technical Disclosure Bullletin, vol. 34, No. 8, Jan. 1992, pp. 409-410.

\* cited by examiner

*Primary Examiner*—Tariq R. Hafiz
*Assistant Examiner*—Scott Sun
(74) *Attorney, Agent, or Firm*—Tarolli, Sumdheim, Covell & Tummino LLP (57) ABSTRACT

The invention relates to a data output method and to a data output system comprising:
a printing device;
a database device in which corresponding reference data and/or control data are stored for a plurality of data output system users;
a data output control device providing or compiling corresponding output data sets and delivering same to the printing device; and
a device for monitoring the providing or compiling and/or the delivering of the output data sets to the printing device.

20 Claims, 4 Drawing Sheets

DATA OUTPUT SYSTEM AND DATA OUTPUT METHOD WITH DATA OUTPUT MONITORING

RELATED APPLICATIONS

This application claims priority from European Patent Application No. 04019708.9 filed on Aug. 19, 2004 and titled "Data Output System and Data Output Method with Data Output Monitoring", which is incorporated herein by reference in its entirety.

FIELD OF THE INVENTION

The invention generally relates to data output systems, in particular, to a data output system with a printing device, a database device, and a data output control device, and a data output method.

BACKGROUND OF THE INVENTION

Data output systems used in prior art (e.g. by banks, insurance companies, etc.) comprise, for instance, a printing device, a database device, and—as an interface between the printing device and the database device—an appropriate data output control device.

The printing device may e.g. be an appropriate rotary printing press, e.g. a sheet-fed rotary printing press, preferably a web-fed rotary printing press (e.g. a (single- or multi-color) web-fed rotary printing press operating pursuant to a corresponding relief, surface, or gravure printing method).

In the case of a web-fed rotary printing press, a coherent paper web rolled off a corresponding paper roll runs through the machine and is cut, possibly folded, and packed (e.g. enveloped) after printing and drying only.

In the database device, a plurality of data may be stored, e.g. corresponding data of bank customers (e.g. prename and surname, or company name, respectively, addresses, information concerning the language to be used, etc.), bank-internal data (e.g. bank-internal addresses, etc.), etc.

The data output control device generates—by using the above-mentioned or further data stored in the database device (and/or one or a plurality of further database devices), and/or data provided by corresponding data delivery applications—corresponding data set printing files that are delivered to the printing device and are printed there.

The above-mentioned further data may, for instance, be corresponding balance of account data, account activity data (account transfer data, interest payment data, account service price data), etc., or, for instance, deposit state data, deposit activity data (purchase, sale, dividend, interest payment data, deposit service price data), etc.

At particular times—especially at the end of the month—there may be a relatively high load of the printing device and delays during printing due to the particularly high printing volume that exists at that time.

For instance, at the end of the month, data output orders—that are possibly triggered automatically—may result in the printing of several thousands of statements of account, of several thousands of statements of deposit, etc.

If the print-out comprises faults, relatively high costs will be incurred since the—entire—print-out possibly will have to be effected again.

Further limitations and disadvantages of conventional and traditional approaches will become apparent to one skilled in the art, through comparison of such systems with the present invention as set forth in the remainder of the present application with reference to the drawings.

It is an object of the invention to provide a novel data output system and a novel data output method, in particular a novel data output system and a novel data output method by means of which the above-mentioned and/or further drawbacks of prior art may be overcome.

SUMMARY OF THE INVENTION

According to the invention, the above or further objects are achieved by the subject matters as defined in the independent claims. The dependent claims define advantageous and preferred embodiments of the present invention.

According to an aspect of the invention, a data output system is provided which comprises:
  a printing device;
  a database device in which corresponding reference data and/or control data are stored for a plurality of data output system users; and
  a data output control device that provides or compiles corresponding output data sets and delivers same to the printing device; and
  a device for monitoring the providing or compiling and/or the delivering of the output data sets to the printing device.

By the monitoring of the providing or compiling and/or the delivering of the output data sets to the printing device, possibly occurring faults may be recognized early—even prior to the printing of the data sets—and may be remedied.

These and other advantages, aspects and novel features of the present invention, as well as details of an illustrated embodiment thereof, will be more fully understood from the following description and drawings.

BRIEF DESCRIPTION OF THE DRAWINGS

The accompanying drawings, which are incorporated herein and form part of the application, illustrate the present invention and, together with the description, further serve to explain the principles of the invention and to enable a person skilled in the pertinent art to make use of the invention.

DETAILED DESCRIPTION OF THE INVENTION

The present invention will now be described in detail with reference to preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

Figure 1:
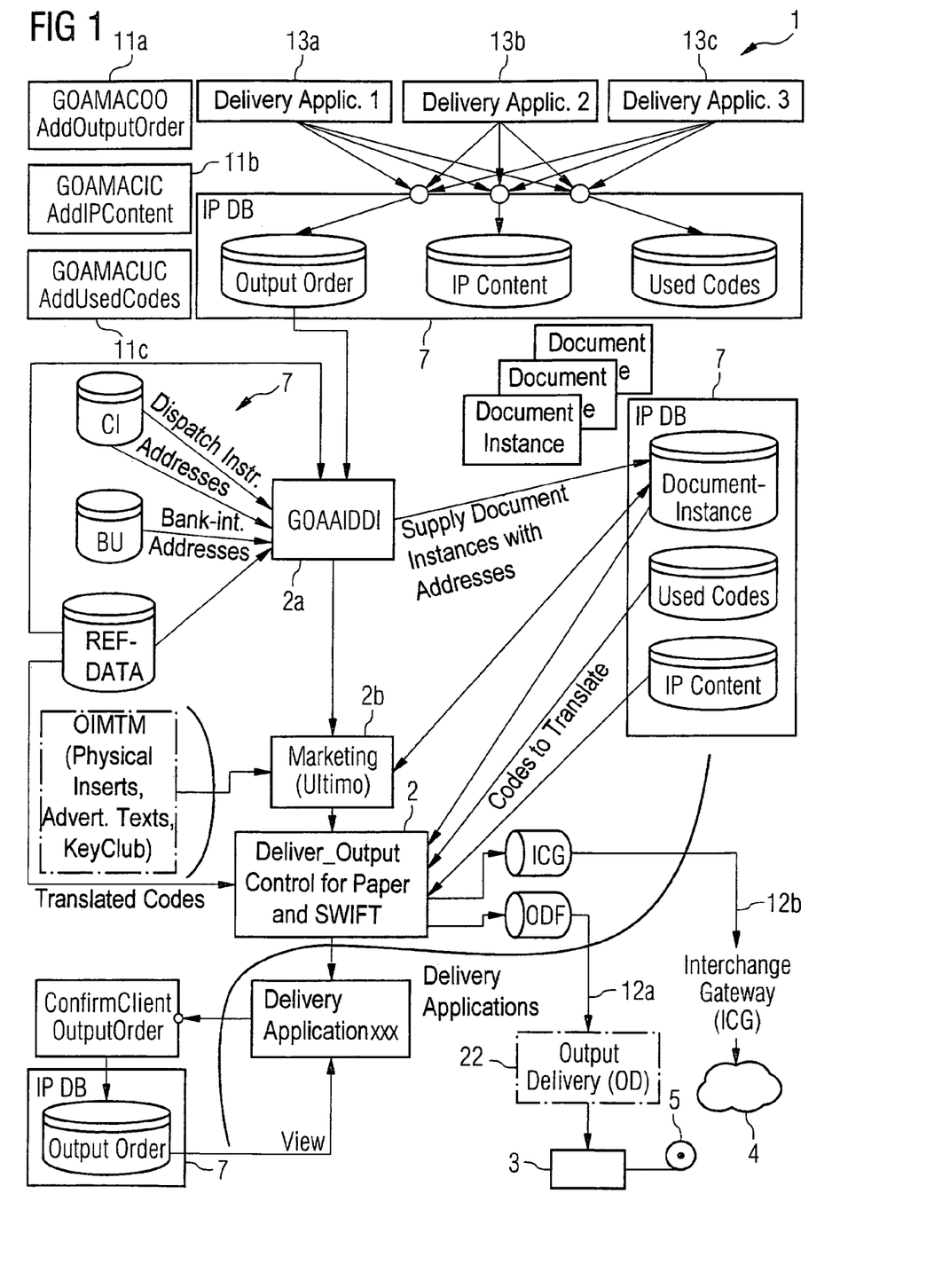
FIG. 1 illustrates a data output system according to an embodiment of the present invention.

In accordance with FIG. 1, a data output system 1 pursuant to an embodiment of the present invention comprises one or a plurality of printing devices 3, one or a plurality of database devices 7, and—as an interface between the printing device 3 and the database device 7—one or a plurality of data output control devices 2.

The data output system 1 may—preferably—be used for outputting data accruing in a bank (or, for instance, an insurance company, etc.), or data generated by computers that are employed there.

As results from FIG. 1, the data output system 1 comprises a plurality of (e.g. more than one (or, alternatively, e.g. more than two or three)) data output channels 12a, 12b, e.g. a printing data output channel 12a ("paper channel") (or, alternatively, e.g. a plurality of printing data output channels), and an electronic data output channel 12b ("SWIFT channel") (or, alternatively, e.g. a plurality of electronic data output channels).

Via the printing data output channel 12a—controlled by the data output control device 2—corresponding output data sets (generated by using the above-mentioned data accruing in the bank (or the insurance company, etc.) or generated by the computers employed there) are delivered to the printing device 3.

The printing device 3 may, for instance, be an appropriate rotary printing press, e.g. a sheet-fed rotary printing press or—preferably—a web-fed rotary printing press 3 (e.g. a (single- or multi-color) web-fed rotary printing press operating pursuant to a corresponding relief, surface, or gravure printing method).

In the case of the web-fed rotary printing press, a coherent paper web rolled off a corresponding paper roll 5 runs through the machine 3 and is cut, possibly folded, and packed (e.g. enveloped) after printing and drying only.

Alternatively or additionally to the printing device 3, the above-mentioned (and/or further) output data sets are—also controlled by the data output control device 2—delivered via the electronic data output channel 12b (also) to one or a plurality of electronic data communication systems 4, so that the output data sets may be recalled electronically by corresponding system users, in particular bank customers and/or bank staff.

Recalling will only become possible once appropriate passwords, codes, etc. have been entered by the system users via the data communication system 4, i.e. once the respective system user has been activated correspondingly.

The data communication system 4 may, for instance, be one or a plurality of computer networks, e.g. the internet, and/or one or a plurality of intranets, and/or one or a plurality of further, electronic data communication systems, e.g. a public or private telephone network, e.g. a fixed network or a mobile network, etc.

In the above-mentioned database devices 7 (e.g. an information package database ("IP DB"), etc.), a plurality of data may be stored, e.g. corresponding data of bank customers (Client Information ("CI")) (e.g. the prenames and surnames of private customers, or the company names of company customers, respectively, addresses, etc.), bank-internal data ("BU") (e.g. the prenames and surnames of bank staff, bank-internal addresses (department, address of location, etc.)), tax data ("Used Codes") (e.g. information concerning the respective language to be used, the respective data to be used, the priority data, etc.), and/or a plurality of further data, e.g. IP Content data, in particular corresponding reference data (e.g. balance of account data, account activity data (account transfer data, interest payment data, account service price data), etc., and/or, for instance, deposit state data, deposit activity data (purchase, sale, dividend, interest payment data, deposit service price data), etc., data output order data ("Output Order"), etc.

The modification/generation/supplementation of corresponding Output Order and Used Code data, etc. may be performed by controlling appropriate services software programs or program modules 11a, 11b, 11c, etc., and may, for instance, be triggered by corresponding requests of corresponding delivery applications 13a, 13b, 13c (delivery application 1, delivery application 2, delivery application 3, etc.).

As results from FIG. 1, data set printing files ("documents") containing corresponding data sets are generated from the data stored in the database device(s) 7, which are—via the printing data output channel 12a and controlled by the data output control device 2—delivered to the printing device 3 and are printed there.

In so doing—as also results from FIG. 1 (cf. e.g. the method steps illustrated there (performed or caused by appropriate software programs or program modules 2a, 2b)—, corresponding further data (e.g. bank-internal data, bank customer data—in particular addresses—, etc.) that correspond to corresponding reference data (e.g. balance of account data, account activity data, or deposit state data, deposit activity data, etc.) may be added, and—further—data, in particular advertising data that are, for instance, stored in a further database device (e.g. advertising slogan data, data for physical inserts, customer binding program ("Key-Club") data, etc.) may be added to the documents generated this way.

Figure 2:
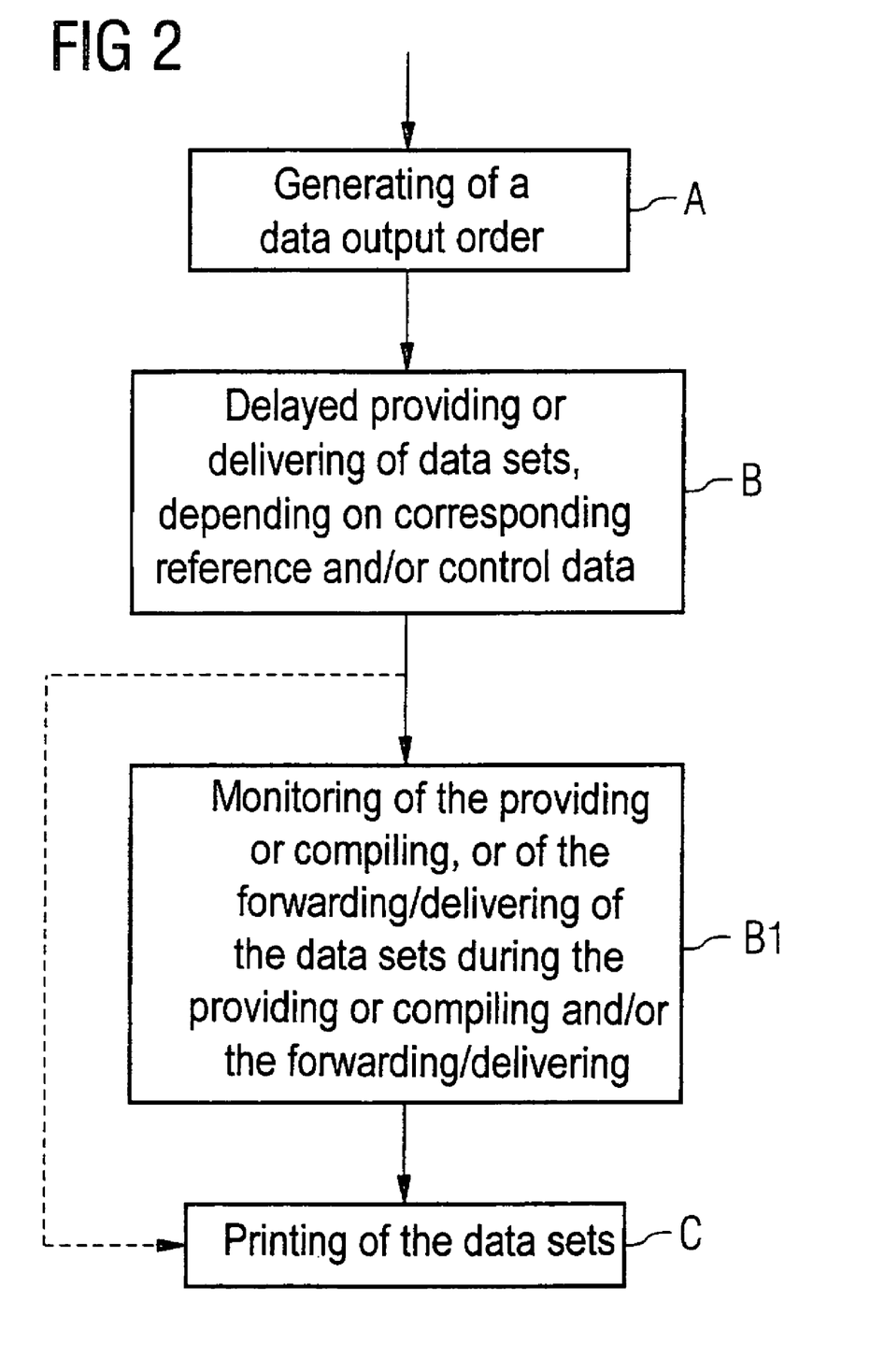
FIG. 2 is a flowchart for illustrating the method steps performed with a data output method according to an embodiment of the invention.

The triggering of corresponding data output orders ("Output Order") for the above-mentioned data output channels 12a, 12b—e.g. by a corresponding (delivery) application—may be performed automatically or semi-automatically, respectively, e.g. time-controlled (e.g. every quarter of an hour, every hour, every day, every week, every month, etc.), and/or condition-controlled (e.g. by an interest termination), and/or time and condition-controlled (e.g. a particular time after a particular event), and/or can be triggered—by a bank staff member and/or a bank customer, etc.—"manually" or "ad hoc" (e.g. by inputting a corresponding data output order at a computer connected to the data output system 1)—cf. also method step A illustrated in FIG. 2.

In the present embodiment, the corresponding data sets or data set printing files, respectively, are—in reaction to a corresponding data output order—not or not necessarily provided or compiled immediately and then delivered to the printing device 3 for printing; instead, the providing or compiling and/or the delivering of the data sets or data set printing files, respectively, can be performed—consciously—with delay in the individual case (e.g. delayed by a delay time predetermined by corresponding control data or calculated by making use of the reference data and/or the control data (cf. also method step B illustrated in FIG. 2)).

The—predetermined or calculated—delay time (that is selected consciously (in addition to system-immanent delays)) may be relatively large, e.g. be more than an hour or more than 24 hours, in particular more than one or several weeks.

The—delayed—providing or compiling and/or the—delayed—delivering of the data sets or the data set printing files, respectively, to the printing device 3 (where the corresponding data sets are then printed out with delay (cf. also method step C illustrated in FIG. 2)) may e.g. be performed as a function of control data characterizing the utilization of the printing device 3, and/or as a function of control data characterizing the priority of a user (bank customer) (allocated to the respective data set) ("user priority data"), and/or as a function of control data characterizing the priority of the respective data set irrespective of the user ("data set priority data"), etc.

By a flexibly selected delay time for the respective data set—depending on the respective utilization of the printing device 3 and the user and/or data set priority—there may be achieved that—even at "peak periods" (e.g. at the end of the month or at the end of the year)—the printing device 3 is not overloaded (since then predominantly data sets for users with high user priority data and/or data sets with high data set priority data—irrespective of the respective user—may be printed).

The user priority data characterizing the priority of a user may, for instance, be defined by a systems administrator (in particular a bank staff member) (e.g. by inputting the corresponding data in a computer connected to the data output system 1 (e.g. upon corresponding instruction of the customer)), and/or by the respective user (in particular the bank customer) himself/herself (e.g. also by inputting the corresponding data in a computer connected to the data output system 1 (after appropriate passwords, codes, etc, have been input)), etc.

The above-mentioned data output control device 2 may be designed such that the providing/delivering of the data sets for users with high priority is—tendentially—delayed less than the providing/delivering of the data sets for users with low priority (and e.g. such that for users with highest priority the data sets are provided/delivered without any delay, if possible).

Correspondingly similar, the data output control device 2 may be designed such that the providing/delivering of data sets with—user-independently—high data set priority is—tendentially—delayed less than the providing/delivering of data sets with—user-independently—low data set priority (and e.g. such that data sets with highest data set priority are provided/delivered without any delay and irrespective of the respectively concerned user, if possible).

In the case of data sets with high or highest priority, respectively, the data sets may, for instance, be data sets triggering corresponding legally stipulated or contractually agreed final terms (e.g. data sets containing data for making up the accounts, etc.).

The priority data characterizing the priority of a data set (or—preferably—the priority of a plurality of similar data sets) may, for instance, be defined by a systems administrator (in particular a bank staff member) and be input in a corresponding computer connected to the data output system 1.

The above-mentioned—delayed—providing or compiling, and/or the—delayed—delivering of the data sets or data set printing files, respectively, to the printing device 3 may—in particular for users with user priority data characterizing a low user priority, and/or for data sets with data set priority data characterizing a low data set priority—be, alternatively or additionally, e.g. also performed such that—at first—output data sets allocated to a user are collected and are only then delivered by the data output control device 2 to the printing device 3 and are printed there when the total data amount of the collected output data sets allocated to the user exceeds a predetermined minimum amount, or the data contained in the collected output data sets exceed a predetermined minimum printing face during printing.

The minimum amount or the minimum printing face, respectively, may—again—depend on the user priority data allocated to the respective user.

By this measure it may be achieved that—simultaneously for one and the same customer—one or several print-outs containing a plurality of data sets may be produced, which can be dispatched in one and the same envelope.

The result thereof is that forwarding expenses can be saved in a substantial scope.

Preferably, the data sets allocated to a particular user are, for this purpose, collected and delivered to the printing device 3 such that as many output data sets as possible that are allocated to one and the same user are printed on one and the same paper roll 5.

With a preferred development of the data output system 1, the collected output data sets allocated to a particular user are delivered to the printing device 3 and printed at the latest when a predetermined maximum period has lapsed since the ordering of the first output data set relating to the respective user (i.e. the first data output order).

The maximum period may—again—be selected as a function of the user priority data allocated to the respective user, and—in particular in the case of a user with user priority data characterizing a high user priority—be e.g. shorter than or equal to 1 week, in particular shorter than or equal to 24 hours, or—in particular in the case of a user with user priority data characterizing a low user priority—be longer than 24 hours, in particular longer than a week (and e.g. shorter than two months, in particular shorter than one month).

By this measure it can be prevented that a user has to wait for too long a time for the data (statements of account, statements of deposit, etc.) that are destined for him/her and have to be sent to him/her.

The above-mentioned—delayed—providing or compiling, and/or—delayed—delivery of the data sets or the data set printing files, respectively, to the printing device 3 can—alternatively or additionally to what has been said above—e.g. also be performed as a function of the capacity of the paper roll 5 printed by the printing device 3, etc. For instance, the data sets or data set printing files, respectively, may be provided or compiled and delivered to the printing device 3 such that a paper roll 5 is printed completely or almost completely.

By that, a reasonable and quick output of data that avoids capacity bottlenecks and is nevertheless capable of flexibly complying with specific customer requests can—altogether—be achieved.

With an advantageous development or further development of the data output system 1 or data output method, respectively, described above by means of FIGS. 1 and 2, the above-mentioned data output control function (in particular the data set collecting or forwarding delay function and functions that will be explained in more detail in the following (and possibly further functions)) is, in accordance with FIG. 3 (and as illustrated in FIG. 1 in broken lines) not performed by the above-mentioned data output control device 2 alone, but by the data output control device 2 (in particular by one or several software programs or software program modules 24 ("LOS") provided there) and a—further—data output control device 22 co-acting with the data output control device 2 (in particular by a software program or software program module 23 ("Control-D") provided there).

The further data output control device 22 may, for instance, be positioned at a distance (e.g. more than 10 m, 1 km, etc. away) from the data output control device 2, e.g. in the proximity of or at the above-mentioned printing device 3 (or in a printing center, respectively), and the data output control device 2 may, for instance, be positioned in a computer center, e.g. the computer center of the bank/insurance company utilizing the data output method.

Figure 3:
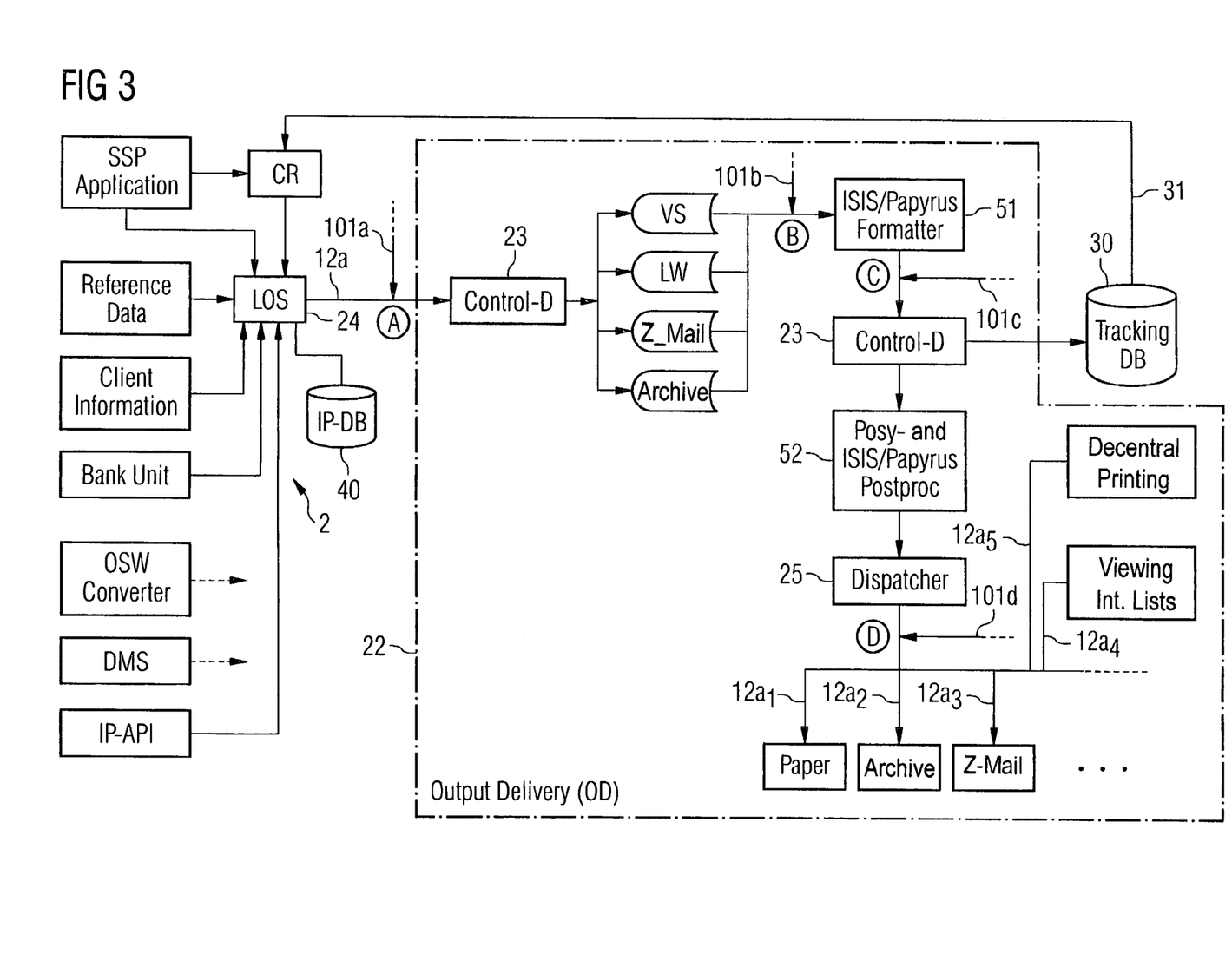
FIG. 3 is a schematic detail representation of the data output control devices and data output channels used with an advantageous development of the invention.

As results from FIG. 3, the data sets or data set printing files, respectively, that are provided—possibly with delay—or delivered—possibly with delay—by the data output control device 22 (i.e. that have been stored intermediately before in a memory device not illustrated and connected with the data output control device 22) may, for instance, be delivered to an end data output channel 12a, "Paper" that is connected with the above-mentioned printing device 3 (and may then—in correspondence to what has been described above—be printed by the printing device 3).

Alternatively or additionally—as is illustrated in FIG. 3—the data sets or data set printing files, respectively (that are, for instance, also delivered to the end data output channel 12a$_1$ "Paper" (or "Z_Mail", etc.) and are printed, for instance, by the printing device 3) may e.g. also be delivered to an end data output channel 12a$_2$ "Archive". The corresponding data sets or data set printing files, respectively—available in a finished printing format—may then be stored permanently—for archiving purposes—(in the above-mentioned printing format or appropriately condensed) in an appropriate (not illustrated) database (e.g. for a certain minimum period, e.g. longer than 1 month, or longer than 1 year, in particular longer than 4 years, etc.).

Alternatively or additionally, data sets or data set printing files, respectively, may—possibly with delay—also be delivered by the data output control device 22 to an end data output channel 12a$_3$ "Z_Mail", and be printed by the printing device 3- or a further printing device. Other than e.g. with the above-mentioned end data output channel 12a$_1$ "Paper", in the case of the end data output channel 12a$_3$ "Z_Mail" the print-outs produced are not dispatched externally after enveloping, but are deposited in the bank and are fetched by the respective customer himself/herself.

As results further from FIG. 3, data sets or data set printing files, respectively, may, alternatively or additionally, also be delivered (possibly with delay) by the data output control device 22 e.g. to an end data output channel 12a$_5$ "Decentral Printing" and be printed decentrally at further printing devices that are different from the printing device 3 and are possibly positioned remote from the latter and/or from the data output control device 22 (e.g. more than 1 km, 10 km, or 100 km away).

Alternatively or additionally, corresponding data sets or data set printing files, respectively, may also be delivered by the data output control device 22 e.g. to an end data output channel 12a$_4$ "Viewing, Internal Lists", may be converted to an appropriate electronic format (e.g. the pdf format), and may be printed locally by staff members of the bank or of the insurance company, respectively (i.e. remote from the above-mentioned control device 22 and/or from the above-mentioned printing device 3, e.g. more than 1 km, 10 km, or 100 km away thereof)—at a computer assigned to the respective staff member or the respective staff group (or the printing device allocated to this computer, respectively).

Alternatively or additionally, corresponding data sets or data set printing files, respectively, may—as results from FIG. 3, controlled by a dispatcher 25—also be delivered to one or several further end data output channels, e.g. to an end data output channel "electronic mail", etc.

In the channel "electronic mail", the data sets may be converted to an appropriate electronic format (e.g. the pdf format), and may be sent electronically, e.g. by e-mail (and attached pdf file) to the corresponding customers, and may be printed locally by the customers (i.e. remote from the above-mentioned control device 22 and/or the above-mentioned printing device 3, e.g. more than 1 km, 10 km, or 100 km away thereof) at the computer of the respective customer (or at a printing device allocated to the computer, respectively). Alternatively or additionally, the respective customer may also recall the corresponding data via a specific internet site (supplied by the channel "electronic mail" with the corresponding data) that is accessible to the respective customer only or is protected by a password, respectively, and may print them locally, etc.

As results further from FIG. 3, the data output control device 22 stores (in particular by the software program or the software program module 23) data with respect to the costs accruing with the above-mentioned data output method, in particular—for the end data output channels 12a$_1$, 12a$_5$, etc.—with respect to the number of/postage expenses for the envelopes sent to a particular customer (and/or with respect to the costs accruing at the end data output channel "electronic mail" and/or "Z_Mail", etc. for a particular customer, etc.) in an appropriate memory device 30 (tracking database ("Tracking DB")) and are—via a channel 31—delivered to the above-mentioned control device 2 (in particular the software program or the software program module 24 ("LOS")), so that corresponding data output costs, in particular postage data, are added to the above-mentioned data sets for the respective customer, so that these costs may be charged to the customer.

As has already been mentioned, with the advantageous development of the invention as illustrated in FIG. 3, the data output control function is performed—jointly—by the control device 2 and the control device 22.

As results from FIG. 3, the data sets provided/collected by the data output control device 2 may be stored intermediately in a memory device 40 (here: an IP database (IP-DB)) connected with the data output control device 2, may be read out again, and may be transmitted—as explained above, possibly with delay—via the channel 12a to the data output control device 22, in particular the above-mentioned software program or software program module 23.

As is also illustrated in FIG. 3, corresponding data sets transmitted—possibly with delay (see below)—by the software program or the software program module 23 to a corresponding software program or software program module 51 ("ISIS/PAPYRUS FORMATTER") are formatted by the software program or the software program module 51 and are then—in formatted form—delivered (back) to the above-mentioned software program or software program module 23.

The data sets delivered (back) to the software program or software program module 23 are transmitted from there—possibly with delay (see below)- to a corresponding (further) software program or software program module 52 ("POSY- and ISIS/PAPYRUS POSTPROCESSING"), are subjected to a corresponding post-processing there, and are then transmitted to the above-mentioned dispatcher 25.

As has already been mentioned before, corresponding data sets (e.g. received by the control device 2, and/or the software program or the software program module 51) may—in a correspondingly similar manner as with the data output control device 2—be stored intermediately by the software program or the software program module 23 in the (not illustrated) memory device that has already been briefly mentioned above and that is connected with the data output control device 22 (or the software program or the software program module 23, respectively). By this measure it is possible that they are read out again at the respectively desired point in time only, i.e. possibly with delay, and are transmitted—as explained above with delay—from the software program or software program module 23 to the software program or software program module 51, and/or—in particular—to the software program or the software program module 52.

The delay that is at most effected by the (further) data output control device 22 or the software program or the software program module 23 ("Control-D"), respectively, may be shorter than the delay effected at most by the data output control device 2 ("LOS" module 24) (the delay effected at most by the further data output control device 22 or the software program or the software program module 23, respectively, may, for instance, be shorter than 1 week or two days, e.g. shorter than 28 hours (e.g. at most one day), and the delay effected at most by the data output control device 2 may be longer than one or two days, or 1 week, respectively (e.g. at most one month)).

By means of the data output control device 2—in particular pursuant to customer-specific requests and bank-technical criteria—corresponding data sets may be collected bit by bit for a particular customer over a particular—relatively long—period (e.g. one month) (said data sets having to be dispatched in one single (monthly) collective envelope) and may be stored intermediately, and the data sets stored intermediately may be transmitted at the end of the above-mentioned period—jointly—to the further data output control device 22, in particular the software program or the software program module 23.

By means of the further data output control device 22, in particular the software program or the software program module 23, e.g. the (possibly not yet jointly delivered) data sets accruing for one and the same customer within a particular—relatively short—period (e.g. within one day) may correspondingly be collected bit by bit in one single (daily) collective envelope for dispatch and may be stored intermediately, and the data sets stored intermediately may be jointly forwarded at the end of the—relatively short—period (in particular with customers for whom there are no indications about the data sets that may already be collected in advance by the data output control device 2).

By this measure it may be achieved that as few envelopes as possible, in particular only one single envelope, have/has to be sent to each customer per day (also to customers for whom no or no sufficient data set collection was performed in the data output control device 2).

In order to recognize faults during the providing or compiling and/or the forwarding/delivering of the output data sets as early as possible and to remedy them, the providing or compiling and/or the forwarding/delivering of the output data sets with the data output system 1 can—as will be explained in more detail in the following—be monitored—optionally—at one of a plurality of monitoring points, e.g. the monitoring points A, B, C, D illustrated schematically in FIG. 3 (or, alternatively, at several ones of the above-mentioned monitoring points A, B, C, D simultaneously).

For instance, at a monitoring point A, the output data sets provided or compiled in the above-described manner by the data output control device 2, in particular the software program or the software program module 24 ("LOS"), and stored e.g. in the above-mentioned memory device 40 (IP database (IP-DB)) and/or forwarded to the further control device 22, in particular the software program or the software program module 23 ("Control-D") can be monitored (or—as will be explained in more detail in the following—particular subsets thereof that can be defined optionally).

Alternatively or additionally, for instance at a monitoring point B, the output data sets provided or compiled in the above-mentioned manner by the above-mentioned software program or software program module 23, and stored e.g. in the above-mentioned memory device connected thereto or in a further memory device and/or forwarded to the software program or software program module 51 ("ISIS/PAPYRUS FORMATTER") can be monitored (or, again—as will be explained in more detail in the following—particular subsets thereof that can be defined optionally).

As is further illustrated in FIG. 3, alternatively or additionally, for instance at a monitoring point C, the output data sets provided or compiled by the above-mentioned software program or software program module 51, and delivered to the software program or software program module 23 ("Control D") (and stored e.g. in the above-mentioned memory device connected thereto or in a further memory device) can be monitored (or, again—as will be explained in more detail in the following—particular subsets thereof that can be defined optionally).

Alternatively or additionally, for instance at a monitoring point D, the output data sets delivered by the above-mentioned dispatcher 25 to the various data output channels ($12a_1$, $12a_2$, etc.) (and e.g. stored intermediately—for a short time—in a corresponding memory device of the dispatcher 25) can be monitored (or, again—as will be explained in more detail in the following—particular subsets thereof that can be defined optionally), etc.

Figure 4:
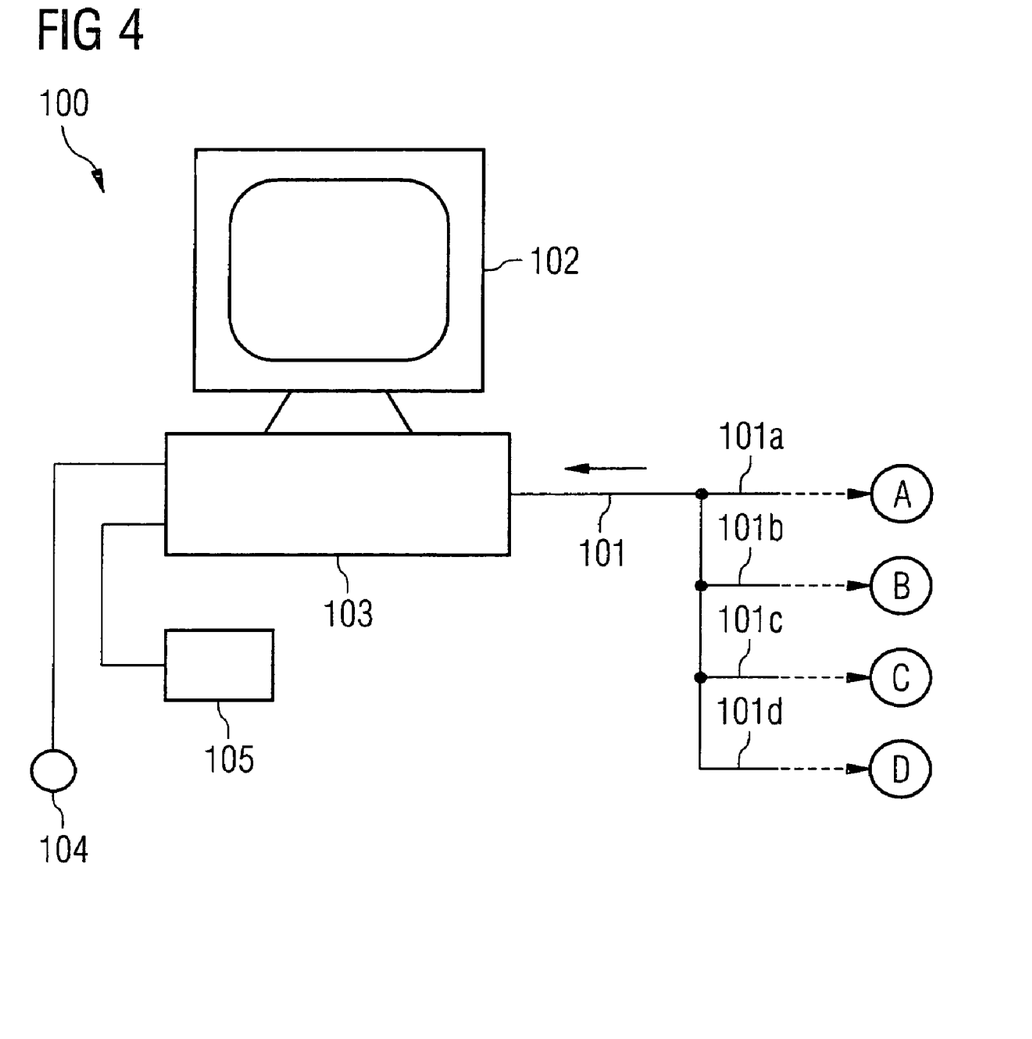
FIG. 4 illustrates a device, in particular a computer, for monitoring the providing or compiling, or the forwarding, respectively, of the data sets output by the data output system.

For the monitoring of the providing or compiling and/or the forwarding/delivering of the output data sets, one or a plurality of monitoring devices 100, e.g. appropriate PCs, workstations, etc. may be provided, which—as is illustrated in FIG. 4—each may comprise a display means 102 (e.g. a screen), a computer means 103 comprising an appropriate memory means, and appropriate input means (e.g. a mouse 104 and/or a keyboard 105, etc.).

If, at a particular monitoring point A, B, C, D selected at the monitoring device 100 by the person operating the device 100, the providing or compiling and/or the forwarding/delivering of the output data sets (or of a subset thereof selected at the monitoring device 100 by the person operating the device 100) is to be monitored, copies of the corresponding data sets (or of the above-mentioned subset thereof) provided or compiled at the respective monitoring point A, B, C, D (e.g. stored in the memory device 40, etc.) or forwarded/delivered there are—e.g. caused by a corresponding software module that is, for instance, stored in the memory device of the computer means 103 (and cooperates with one or a plurality of further, not illustrated software modules)—forwarded, via corresponding lines or channels 101a, 101b, 101c, 101d and the line 101 (or the channel 101) connected with the monitoring device 100, to the respectively inquiring monitoring device 100, and are displayed on the display means 102.

As output data set subset, e.g. the output data sets allocated to a particular data output channel (e.g. the data output channel $12a_1$, or alternatively the data output channel $12a_2$) may be selected by the person operating the device 100, so that merely these data sets (not, however, the remaining data sets allocated to the remaining channels $12a_2$, etc.) are forwarded from the respective monitoring point A, B, C, D to the device 100 and are displayed on the display means 102.

For defining the subset—alternatively or additionally to the channel information—filter or output data set selection criteria selecting the respective report (e.g. interest termination, statement of account, etc.) and/or the VE (i.e. the respective (bank) processing unit, or the respective geographical branch group and/or the respective database partition, etc., may also be used.

By the monitoring of the providing or compiling and/or the forwarding/delivering of the output data sets to the printing device 3 (in particular during the above-mentioned providing or compiling and/or forwarding/delivering processes (cf. also method step B1 illustrated in FIG. 2), possibly occurring faults may be recognized early—even prior to the printing of the data sets—and may be remedied.

While the invention has been described with reference to certain embodiments, it will be understood by those skilled in the art that various changes may be made and equivalents may be substituted without departing from the scope of the invention. In addition, many modifications may be made to adapt a particular situation to the teachings of the invention without departing from its scope. Therefore, it is intended that the invention not be limited to the particular embodiment disclosed, but that the invention will include all embodiments falling within the scope of the appended claims.

What is claimed is:

1. A data output system comprising:
    a printing device;
    a database device, in which reference data and control data are stored for a plurality of data output system users;
    more than two series-connected computing devices that are configured to perform a series of continuous successive steps to stepwise compile, format, and further process output data sets associated with one single data output order from data stored in the database device, each of the series-connected computing devices performing different ones of the series of continuous successive steps, wherein each of the series-connected computing devices is adapted to store copies of the data sets generated by a respective series-connected computing device in an associated memory,
    a data output control device configured to deliver the compiled and formatted and further processed output data sets to the printing device for printing of the compiled and formatted and further processed output data sets, and configured to delay the delivery of the compiled and formatted and further processed output data sets to the printing device depending on the reference data or control data, and;
    a monitoring device for monitoring the progress of the process of performing the series of continuous successive steps to stepwise compile, format and further process the output data sets associated with the one single data output order in the series-connected computing devices by displaying the copies of the data sets stored in the memories associated with the series-connected computing devices at a display prior to the delayed delivery of the compiled and formatted and further processed output data sets to the printing device.

2. The data output system according to claim 1, wherein the point in time of the delivering of the output data sets depends on the reference data and the control data.

3. The data output system according to claim 1, wherein—depending on the reference data and the control data—a delayed delivery of the output data sets is performed by the data output control device.

4. The data output system according to claim 3, wherein the delay is more than one hour.

5. The data output system according to claim 1, said system comprising a further data output control device that delivers output data sets received from the data output control device to the printing device.

6. The data output system according to claim 5, wherein—depending on the reference data and the control data—a delayed delivery of the output data sets to the printing device is performed by the further data output control device.

7. The data output system according to claim 5, wherein the monitoring device is designed such that it is adapted to monitor the delivery of the data sets from the data output control device to the further data output control device, or wherein the device is adapted to display data sets delivered from the data output control device to the printing device, respectively.

8. The data output system according to claim 5, wherein the monitoring device is designed such that it is adapted to monitor the delivery of the data sets from the further data output control device to the printing device, or wherein the device is adapted to display data sets delivered from the further data output control device to the printing device, respectively.

9. The data output system according to claim 1, said system additionally comprising means for formatting and forwarding the data sets.

10. The data output system according to claim 9, wherein the monitoring device is designed such that it is adapted to monitor the forwarding of the—formatted—data sets or to display the forwarded—formatted—data sets, respectively.

11. The data output system according to claim 1, said system additionally comprising means for forwarding the data sets to one of a plurality of data output channels.

12. The data output system according to claim 11, wherein the monitoring device is designed such that it is adapted to monitor the forwarding of the data sets to the corresponding data output channel, or to display the data sets forwarded to the corresponding data output channel, respectively.

13. The data output system according to claim 1, wherein output data sets allocated to a particular user are collected and are delivered to the printing device only or at the latest when a predetermined maximum period has lapsed since the providing of the output data sets.

14. The data output system according to claim 1, wherein the delayed delivery of the output data sets to the printing device is performed as a function of the capacity of a paper roll printed by the printing device, in particular such that the paper roll is completely printed with the respectively delivered output data sets.

15. The data output system according to claim 1, wherein output data sets allocated to a user are collected and are delivered to the printing device such that as many output data sets as possible that are allocated to one and the same user are printed on one and the same paper roll.

16. A data output method, comprising using
    a printing device,
    a database device, in which reference data and control data are stored for a plurality of users,
    more than two series-connected computing devices that are configured to perform a series of continuous successive steps to stepwise compile, format, and further process output data sets associated with one single data output order from data stored in the database device, each of the series-connected computing devices performing different ones of the series of continuous successive steps, wherein each of the series-connected computing devices is adapted to store copies of the data sets generated by a respective series-connected computing device in an associated memory, and
    a data output control device configured to deliver the stepwise compiled, formatted, and further processed output data sets to the printing device for printing,
    wherein the method comprises:
        using the more than two series-connected computing devices to stepwise compile, format, and further process output data sets from data stored in the database device;
        delivering the stepwise compiled, formatted, and further processed output data sets as a function of the reference data and the control data; and
        monitoring using a monitoring device the progress of the process of performing the series of continuous successive steps to stepwise compile, format, and further process the output data sets associated with the one single data output order in the series-connected computing devices,
        wherein the data output control device is adapted to delay the delivery of the stepwise compiled and formatted and further processed output data sets to the printing device depending on the reference data or control data, and wherein the monitoring device is adapted to display copies of the data sets stored in the memories associated with the series-connected computing devices at a display prior to the delayed delivery of the stepwise compiled and formatted and further processed output data sets to the printing device.

17. A computer-readable storage medium for storing a computer program with program code means for performing the method steps indicated in claim 16 when the program is executed on a computer.

18. The computer-readable storage medium according to claim 17, said computer-readable storage medium comprising a computer diskette.

19. The data output system according to claim 4, wherein the delay is more than 24 hours.

20. The data output system according to claim 4, wherein the delay is more than one week.

* * * * *